US 11,733,697 B2

(12) United States Patent
Poole-Anderson

(10) Patent No.: US 11,733,697 B2
(45) Date of Patent: Aug. 22, 2023

(54) CONTROL SYSTEM

(71) Applicant: Hybrid Vision Limited, Westbourne (GB)

(72) Inventor: Simon Poole-Anderson, Westbourne (GB)

(73) Assignee: Hybrid Vision Limited

( * ) Notice: Subject to any disclaimer, the term of this patent is extended or adjusted under 35 U.S.C. 154(b) by 0 days.

(21) Appl. No.: 17/760,263

(22) PCT Filed: Feb. 5, 2021

(86) PCT No.: PCT/GB2021/050266
§ 371 (c)(1),
(2) Date: Aug. 5, 2022

(87) PCT Pub. No.: WO2021/156634
PCT Pub. Date: Aug. 12, 2021

(65) Prior Publication Data
US 2023/0071727 A1 Mar. 9, 2023

(30) Foreign Application Priority Data
Feb. 7, 2020 (GB) .................................... 2001712

(51) Int. Cl.
*G05D 1/00* (2006.01)
*G05D 1/02* (2020.01)
*B60W 30/182* (2020.01)
*B60W 50/08* (2020.01)

(52) U.S. Cl.
CPC ......... *G05D 1/0061* (2013.01); *G05D 1/0221* (2013.01); *B60W 30/182* (2013.01); *B60W 50/082* (2013.01); *G05D 2201/0209* (2013.01)

(58) Field of Classification Search
CPC ............... G05D 1/0061; G05D 1/0221; G05D 2201/0209; B60W 30/182; B60W 50/082
See application file for complete search history.

(56) References Cited

U.S. PATENT DOCUMENTS

| 7,510,038 | B2 * | 3/2009 | Kaufmann ........... B62D 15/029 |
| | | | 382/104 |
| 2017/0286654 | A1 | 10/2017 | Nicoll |
| 2018/0229713 | A1 | 8/2018 | Gagnon et al. |
| 2018/0239352 | A1 | 8/2018 | Wang et al. |
| 2019/0064805 | A1 | 2/2019 | Frazzoli et al. |

FOREIGN PATENT DOCUMENTS

EP          3 091 411         11/2016

OTHER PUBLICATIONS

International Search Report and Written Opinion for PCT App. No. PCT/GB2021/050266, dated Apr. 26, 2021, 13 pp.
Search Report Under Section 17 for App. No. GB2001712.5, dated Aug. 11, 2020, 1 p.

* cited by examiner

*Primary Examiner* — Jason Holloway
(74) *Attorney, Agent, or Firm* — Dawn-Marie Bey; Bey & Cotropia PLLC

(57) ABSTRACT

A controller for an autonomous motive entity which comprises a neural processor (6) and a mechanical switch (20), and the switch capable of being set to one of at least three conditions (4b;5b;11), each condition indicative of a respective mode of operation of the controller, and the controller comprising three modules which each comprise respective instructions (4e, 4a, 5a) to implement a respective mode of operation of the entity, wherein one of the three modes is that in which the entity is caused to become disabled.

12 Claims, 1 Drawing Sheet

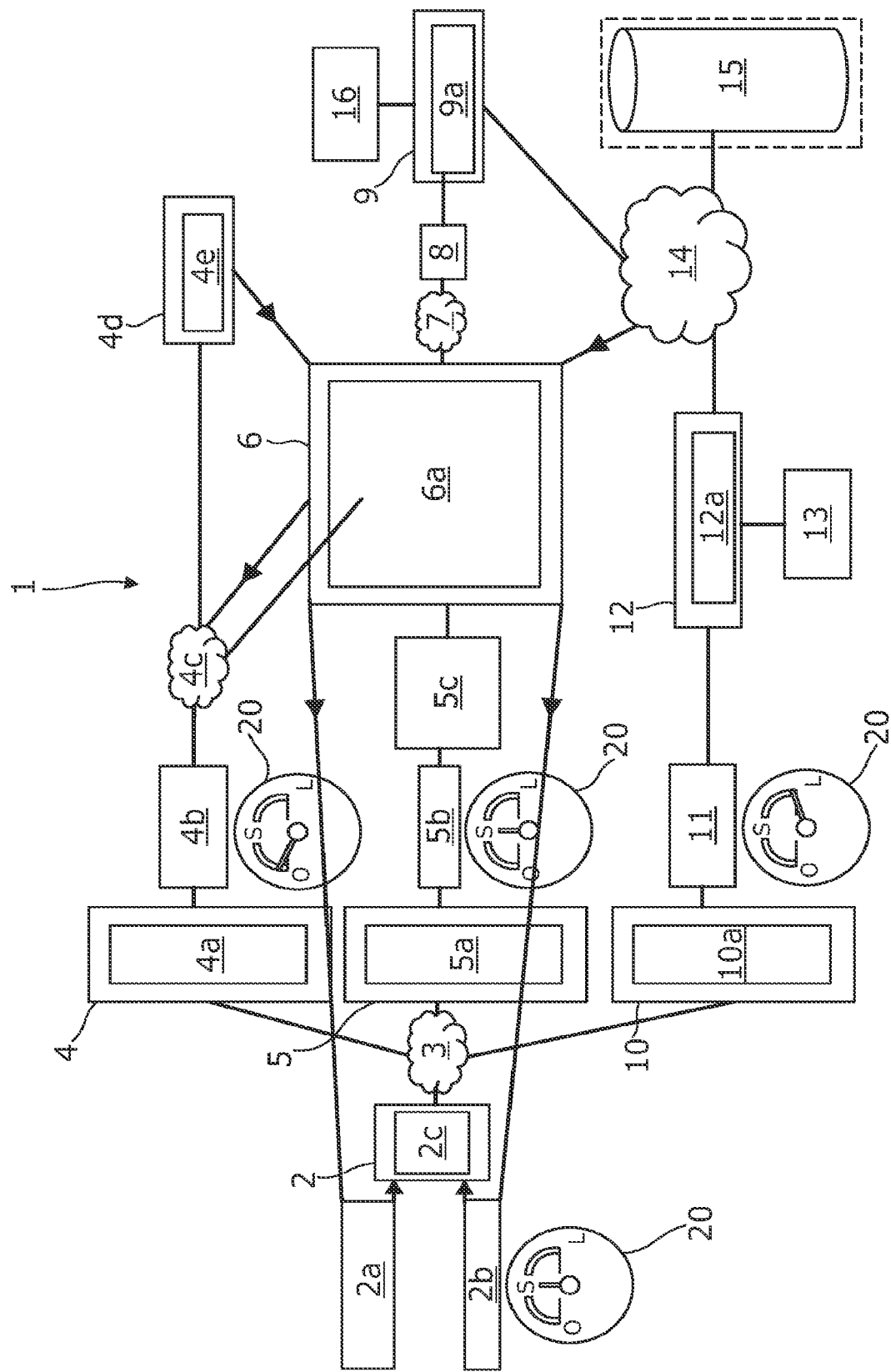

CONTROL SYSTEM

TECHNICAL FIELD

The present invention relates generally to control systems, such as a controller, and in particular, although not exclusively, to the safe operation of control systems suitable for use in unmanned and autonomously operating vehicles and weapons.

BACKGROUND

Unmanned and autonomously-operating vehicles and weapon systems are increasingly prevalent in both civilian and military environments and contexts.

The degree of autonomy of unmanned and autonomously operating vehicles and weapons systems may be classified as one of the following: human-operated, human-delegated, human-supervised or fully autonomous. In a fully autonomous implementation, the nature of the appropriate decision determination for actions, such as preserving a human life at the expense of another human life, is increasingly subject to acute scrutiny regarding whether machine-derived decision determination is an optimal representation of human values and a human-derived judiciary can be suitably applied in this context.

Fully autonomous unmanned and autonomously operating vehicles and weapon systems are typically able to learn from perceived errors and independently determine decisions for corrective action. However, such abilities can be vulnerable to malicious or unintended reconfiguration, through either human or autonomous intervention, whereby decisions and executed actions are not an optimal representation of human values, e.g. unlawful killing.

It is increasingly desired to provide control systems onboard unmanned and autonomously operating vehicles and weapons systems capable of independently generating decisions that represent safe operation, namely an optimised representation of human values, and these may be subject to or may be capable of being subject to, a human-derived judiciary, resistant to subversion, interference of malfunction and capable of securing operational integrity through either disablement or self-destruction.

We have realised that it would be advantageous to provide an improved control apparatus for controlling autonomously-derived motion control (such as steering) and/or power control (such as to discontinue a supply of power, or deliver a power surge, in order to disable a vehicle) in vehicles and weapons which are unmanned and/or operationally autonomous.

SUMMARY

According to a first aspect of the invention there is provided a controller for an autonomous motive entity which comprises a neural processor and a mechanical switch, and the switch capable of being set to one of at least three conditions, each condition indicative of a respective mode of operation of the controller, and the controller comprising three modules which each comprise respective instructions which relate to implementation a respective mode of operation of the entity, wherein one of the three modes is that in which the entity is caused to become disabled.

The controller may be viewed as comprising one or more mechanisms and machine-readable instructions which provide for autonomously derived motion control and/or power control (for example to effect temporary or permanent disablement) of an autonomous motive entity, to determine decisions and actions to be executed within physical and virtual environments to effect events present or foreseen, and where appropriate, to permanently or semi-permanently disable or destroy the entity (possibly including disablement of relevant connected or directly related systems or slave systems), and the motion control of the entity may be achieved by way of motion and/or power control instructions which are derived from processed comparisons between sensors and captured phenomenon data and relative alignment with a reward model instructional framework processed by a neural network processor.

A mode of operation of the controller may include the use and/or operation of the entity.

The condition of the mechanical switch may be brought about/changed as a result of an input signal caused to be generated by a human operative, such as an (authorised) technician. The condition of the mechanical switch may set/adjusted by way of direct, physical manual intervention, such as by way of a mode selection input device. Such a device may comprise a rotatable and/or translatable component which can be urged into different respective positions by an operative. The device may be arranged to receive a tool in order to allow an operative to manually adjust the position, or the device maybe something which an operative can grip or push (such as a button, knob, for example). The switch mechanism may be viewed as manually controllable or manually settable.

The controller may comprise an actuator which is responsive (directly or indirectly) to a control signal from the neural processor and/or a signal from a different processor of the controller so as to control the mechanical switch condition. Thus, the mechanical switch may be considered as having a dual nature in which it is controllable to some extent by human/manual intervention and to some extent by the controller itself (e.g. in response to a control signal generated and output by a processor of the controller), autonomously.

The position/condition at which the switch is set may result in the implementation or bringing into effect of a mode of operation.

The mechanical switch may be such that unless it is in a predetermined condition then a mode of operation which relates to that condition cannot be implemented. The implementation/adoption of a particular mode of operation may require that the mechanical switch is in a condition which relates to that condition.

The controller may be viewed as comprising a neural network processor, and a processor (or processors) which respond to predetermined and/or stored instructions relating to each of the three modes of operation, and how each of the modes is implemented, in conjunction with any required processing by the neural processor. The neural processor may be configured to implement instructions which are capable of being modified/updated.

Where the entity is in the state in which it is caused to become disabled, this includes substantially permanent or semi-permanent disablement, inoperability and/or destruction of the entity. Disablement may include incapacitation.

The mode in which the entity is caused to become disabled may be termed a lock mode. In the lock mode it is preferably not possible for any human controlling intervention of the entity through the controller, even, say, on presentation or input of a quantum key or other credential.

Both permanent/temporary disablement and self-destruction include that the entity is substantially inoperable, preferably at least in relation to the key or primary functionalities of the entity.

The controller may comprise an immobilizer and/or an explosive charge, in order to effect the disablement functionality of the lock mode. The disablement functionality of the lock mode may include the generation of a power surge/overload or spike which disables devices or sub-assemblies which are required to provide or deliver motion or motion control to the entity. Conversely, the control of power for the disablement functionality may be brought about by discontinuing a supply of power to a motion generating or motion controlling device or system. The disablement functionality may result in the full or partial disablement, locking or destruction of the controller, or devices or sub-assemblies of the entity (including any system or apparatus that is 'downstream' of the controller wherein the controller itself is always furthermost 'upstream'/ahead of other systems. The controller may be viewed the 'master system' and exerts control over 'slave systems' which themselves can be disabled or destroyed along with the controller.

The controller may be viewed as comprising at least one algorithm and at least one switch mechanism. The controller may be viewed as comprising a number of modules and a number of devices/sub-assemblies, and a communications port which allows (restricted/controlled) data communication with an external data source.

The neural processor may be arranged to implement a reward model instructional framework on which outputs from the processor are derived/based.

Motion control and/or power control instructions for the entity may be derived from comparisons between sensors and captured phenomena data, and relative alignment with a reward model instructional framework, processed by the neural processor and/or one or more other processors of the controller.

The controller may be arranged to implement at least one of autonomously derived motion control and autonomously derived power control, in respect of the host autonomous unmanned entity. The controller preferably uses sensed or detected data, and/or received data (say from a communications network) in order to do so.

The controller may be arranged to determine decisions and actions to be executed within physical and/or virtual contexts/environments to affect events past or foreseen. Some examples of virtual phenomena include: internet activity, monitoring data flow over a communications network, cyber space, news channels and virtual structures, and one, some or all of those may be used.

The controller may be arranged to autonomously derive instructions to further affect the motive entity.

The controller may be arranged to compare physical or virtual phenomena data of readable attributes present or foreseen, against a reward model framework so as to generate proposed instructions or generating new instructions in more optimal adherence to the specified reward model instructional framework.

The controller may be arranged to be capable to determine positive or negative correspondence with mean values of a reward model instructional framework.

The controller may be installed onboard, attached to or incorporated with the entity. It will be appreciated that sub-systems or devices may be provided downstream (in relation to the control command flow sequence); this may include one or more slave systems.

One of the modes of operation (which may be termed a safe mode) in which decisions are independently generated which are representative of (deemed) safe operation of the entity, wherein safe operation includes conformity with an optimised representation of human values. The safe mode may be termed the default or normal mode of use/operation of the entity. In this mode, motion control and/or power control signals/instructions for the entity may be derived from comparisons between sensors and/or captured phenomena data, and relative alignment with a reward model instructional framework, processed by the neural processor and/or one or more other processors of the controller.

The controller may be arranged to check for the presence of machine-readable attributes associated with a specified operation, and where specified though machine-readable instructions cause the controller to autonomously derive instructions to control motion and/or power of the entity, leading to decisions and actions to be executed that affect physical and/or virtual environments and/or events present or foreseen.

The controller may comprise a communications port which is arranged to receive data from a communications network, such as the Internet, and the neural processor arranged to be capable of generating control signal outputs based on information received thereby, or taking the same into due account or into account to at least some extent. For example, this may include adjusting a course in view of a received weather report that adverse weather conditions are likely to be encountered otherwise.

The neural processor may be arranged to be predictive in the sense that includes data received (either from the onboard sensors and/or the external communications port) can be scrutinised to determine the likelihood of a future predicted event which is determined based on inferences or projections drawn from data received, and/or a value/score associated with the same.

One of the modes of operation (which may be termed an open mode) in which on receipt of a valid credential, may allow the reward model instructional framework which is implemented by the neural processor, or more generally instructions implemented thereby, to be changed/updated. The credential may include a cryptographic key. The credential may include a (valid(ated)) quantum key.

The controller may be arranged such that a check is made for the presence of a valid key (such as a quantum key data signal), and where present, allow the prevailing reward model instructional framework to be changed.

The controller may be arranged to be set into the open mode with the entity stationary. It may be a requirement that the open mode can only be set when the entity is stationary.

In the open mode, the controller (or rather the module associated with the implementation of the open mode) may comprise executable instructions which on determination of an edge-case, cause exemplar data to be collected/collated and made available for review by a human. The exemplar data may include audio and/or video footage collected/recorded by one or more sensors installed onboard the entity. The exemplars may be used in relation to the training of the controller by way of reward model feedback, and the training conducted under the supervision of an operative. Once the training of the reward model is complete, the controller may then be signed off for active service. The open mode may be arranged to be used during a training phase of the controller.

The neural processor, once described and configured (trained, and training may be viewed as process of refinement) by a technician, to substantially autonomously operate in either of the safe or lock modes. Each mode may be aligned with a specified reward model instructional framework and to autonomously derive decisions and actions within the parameters of the framework.

The controller may be such that suitable exemplar data is determined/selected. The controller may be such as to use a number or ensemble of predictors to select exemplar data such that two or more predictors disagree with each other the most, or to the largest extent, based on the implemented reward model instructional framework.

An edge-case exemplar may only be capable of being generated on receipt of a valid credential. The credential may include a cryptographic key. The credential may include a quantum key. An edge-case exemplar may only be caused to be generated at the instigation of a human-originating input signal, e.g. a command initiated by a technician. An edge-case may include a decision which involves a moral dilemma or difficult moral decision.

The controller may be arranged to operate in any one of the three modes (open, lock and safe), with each mode aligned to a specified processor and associated operating state instructions as described (by a technician).

The controller may comprise a memory, arranged to store data relating to decisions and actions, taken by the controller, and/or outcomes of the same, during at least one of a training phase and an in-service active phase.

The controller may be arranged such that without the presence of a valid key, only safe and lock modes may be operational. Additionally, human intervention is not permitted whereby decisions (which may be referred to as Eudaimonian Directives) and actions are executed autonomously. The controller may be such that in safe or lock mode the controller is arranged to resist or substantially tampering or interference.

The controller may be arranged to generate a human-readable audit or log of actions taken and/or decisions made by the neural processor either by way of an edge-case review or stored in a data repository, and further process positive or negative correspondence with the reward model framework.

The controller may be arranged to determine whether received data sets and/or predictions based on received data sets, offer optimal reward to the reward model framework.

The controller may be arranged to provide power and/or motion control instructions to maintain a status quo (for example, an active/prevailing Eudaimonian Directive).

The controller may be arranged to provide power and/or motion control instructions to disrupt a status quo (for example, a proposed Eudaimonian Directive).

The controller may be arranged to score a data set, or a predicted event or action, against a number of criteria which at least in part define the reward model framework. The controller may be arranged to make decisions and bring about actions which are optimally aligned with the reward model framework.

The controller may be arranged to implement the continued capture and assessment of received data and derived values to determine positive or negative correspondence or relationship with mean values of a specified reward model instructional framework.

The neural processor may be arranged to substantially continuously compare received data, and predictions based on the received data sets, with the reward model framework.

The controller may be arranged to cause the neural processor to provide an assessment of pre-determined real-time and foreseeable phenomenon data sets, and derive values therefrom so as to determine positive or negative correspondence the reward model framework.

The controller may be arranged to be self-corrigible which may include deriving and executing new instructions to overwrite and override current instructions without human intervention (or in a similar manner to supplement existing instructions with newly generated instructions). Preferably this self-corrigibility is in adherence with the reward model framework.

The controller may be viewed as being configured to formulate 'reasons' for doing things based upon optimised (corrigible) adherence with an instructional reward model framework, itself an optimised representation of human values and manifestation of 'ought'. Further, reasoning is output (to a human judiciary via a black box as a log) and manifest (decision/action in physical or virtual environments) and so constitutes a (machine-derived) 'reason to do something'

By 'autonomous motive entity' we include an autonomous motive entity, which may be manned or unmanned, and may comprise a vehicle or a weapon. Within the context of the invention, we include entities which are autonomous in relation to their motion control, but which may carry people, such as an autonomous car, or autonomous transport for humans. The entity may comprise a drive assembly or a motor assembly. The entity may comprise a power source or fuel, for connection to the drive or motor.

By 'neural processor' we include a data processing apparatus which is arranged to implement a machine-learning algorithm or processing and produce an output based on such processing, this may include the implementation of a predictive model. The neural processor may be viewed as a neural network processor.

By 'mechanical switch' we include a single physical entity or assembly, as well as a number of physically distinct assemblies/devices which collectively perform a switching functionality, over the three operational states. Where a single entity is provided this is arranged to adopt at least three respective conditions, each condition characteristic of a respective one of the three operational states. Each condition may include a part of the assembly being in a respective (predetermined) position (in space). The switch may include one or more moveable components or parts. The one or more moveable components may be arranged to be acted upon by an actuator or drive (which is brought about by a command signal of the controller).

Each module (for each mode of operation) may comprise machine-readable and executable instructions. There may be provided a sub-module to bring about a change in operational mode position of the switch and a sub-module to implement the respective mode which corresponds to said operational mode.

The neural processor may be arranged to monitor an instantaneous condition of the switch (e.g. to determine which position the switch is currently in).

According to a second aspect of the invention there is provided an autonomous motive entity which comprises the controller of the first aspect of the invention.

The entity may comprise one or more sensors to detect events and phenomena which are external of the entity.

According to a third aspect of the invention there are provided machine-readable instructions which are arranged to implement the functionality of the controller of the first aspect of the invention (or any functionality of the controller described herein).

According to a further aspect of the invention there is provided a method of operation of the controller of the first aspect of the invention, which may comprise any of the steps disclosed herein as being performed by the controller. The method may include the ability of the controller to autonomously determine and execute change of switch position.

It will be appreciated that when above reference is made to a stated functionality of the controller or the neural processor, that this may be derived from associated instructions.

The instructions may be recorded on a portable data carrier, embodied as a software product or realised as hardware or firmware (e.g. including circuitry), or carried in a signal.

The instructions may be such as to cause the neural network data processor to be corrigible in the assessment of correspondence of captured phenomenon data sets with the specified reward model instructional framework by deriving and executing new instructions to overwrite and override current instructions (such as an active Eudaimonian Directive) without human intervention.

According to a further aspect or embodiment of the invention there are provided machine-readable instructions for execution by a data processor, the instructions arranged to cause the processer to capture phenomenon data sets and derive values to determine positive or negative correspondence with mean values of the specified reward model instructional framework to autonomously maintain current instructions or derive new further instructions that directly affect further motion and power control causing actions to be executed by vehicles or weaponry without human intervention.

The information may be indicative of the type, quality, kind or value of the captured phenomenon data, or of characteristics of the specified instructional framework, or of characteristics of the current instructions or of characteristics of the new further instructions that are autonomously derived.

The control controller may comprise multiple commands to maintain current instructions or to derive new instructions that directly affect further motion control in vehicles and weaponry or directly affect power control to cause (product equipped) vehicles and weapons to be semi-permanently or permanently disabled.

According to yet a further aspect or embodiment of the invention there is provided a method of generating the autonomous vehicle and weaponry control product instructions, the method comprising incorporating information associated with the captured phenomenon data sets, derived values and associated correspondence with the specified reward model instructional framework, the correspondence to be arranged to be identifiable by a data processor so as to allow the data processor to determine and autonomously output instructions to maintain current instructions or to derive new instructions that directly affect motion and/or power control in vehicles and/or weaponry.

Associated information, or the values, assessment and instructions associated with the information, may be incorporated into the vehicle and/or weapon motor function and power control apparatus prior to the determination of phenomenon data set values or new instructions.

The invention may include one or more features as described in the description and/or as shown in the drawings, either singularly or in combination.

BRIEF DESCRIPTION OF THE DRAWINGS

Various embodiments will now be described, by way of example only, with reference to the following drawings in which:

FIG. 1 is a schematic representation of the logical architecture of a controller for an unmanned and autonomous entity, including various functional modules and devices/sub-assemblies.

DETAILED DESCRIPTION

There is now described a controller for an autonomous and unmanned entity, which may be a vehicle or a weapon. As will be described below, the controller is arranged to function in one of three modes (or states) of operation (or use). These operational modes are termed the Open Mode, the Safe Mode and the Lock Mode. In that regard the controller comprises a mechanical switch 20. These modes and the selection of these modes lead to enhanced control and operation of an autonomous and unmanned motive entity.

With reference to FIG. 1, there is shown a communications network 1 which embodies the controller, and which comprises a data processor 2, which is provided with input devices 2a and 2b. A technician may bring about an operating position of either safe or open, only, and the controller is arranged to bring about the Lock mode autonomously (as a result of a determination by the neural processor).

The controller is also provided with a neural network processor 6a, which executes stored instructions 6b, which implement a reward model framework (which in conjunction with other module(s) sub-assemblies of the controller provides the controller and vehicle/weapon that it is provided with) autonomy of control.

A switch mechanism 20 is provided as part of the controller which is arranged to switch to one of three positions, each of which relates to a respective mode of operation, namely Lock, Open and Safe. The switch mechanism comprises a part which can be moved to selectively one of the three positions. The controller is arranged to monitor which position the switch mechanism is in (for example through the use of sensors).

As described in this document, the switch mechanism 20 can be caused to be operated either by a human or by the controller itself. This may be termed dual operability. As is disclosed further below, the controller is responsive to the switch mechanism but is nevertheless responsive to itself (in relation to the mode of operation that it is set to).

The processor 2 is provided in a memory thereof with instructions 2c, which when executed cause the processor 2 to process and bring into effect a mode of operation for the entity, in the manner more fully described below, by way of an output control signal which brings a relevant one of the processors 4, 5 or 10 into use. When a particular mode of operation is brought into effect, a relevant module (which comprises machine-readable instructions) is implemented by a respective processor, as will be described below.

The controller 1 further comprises a sub-network 3 to allow data communication between the data processor 2 and the data processors 4, 5 and 10.

The processor 4 is arranged to implement the instructions stored in module 4a in relation to the Open mode of operation. (It will be appreciated that the processor 4 and the stored instructions could be collectively termed a module.) The instructions set the operational mode mechanism 4b to the Open condition. Once in the Open condition, the controller, through a communications port, is arranged to be capable of accepting a control signal which allows a technician to amend the instructions 6a, which relate to implementation of the reward model framework which is executed by the neural network processor 6. This control signal must be one which is validated, for example through the use of a credential which is included in the signal. The validating credential may comprise a Quantum Key Distribution type arrangement, although other types of credential could be used. The robustness of the signal received may be continuously monitored for presence of its validity during an informational exchange (such as by way of one or more challenge-response sequences).

With further reference in relation to the Open mode, a sub-network 4c allows for a data signal to be communicated to a processor 4d. The processor 4d is arranged to process instructions for an edge-case review, which is then caused to be processed based on the current reward framework 6a, data sets and predictions. Edge-case reviews may be used during a training phase.

It will be appreciated that the Open mode is intended to be used only when the motive entity is not in active use (e.g. moving or being driven). Nevertheless, the open mode may be implemented whilst the entity is in motion/active, but this may not, in some contexts, coincide with best practice.

If an externally originating validated data signal is not received within a predetermined time whilst in the Open condition then the processor 6 is arranged to cause the switch operating position to be adjusted from an Open mode to a Lock mode.

In the Safe mode, the processor 5 is used, and implements the instructions stored at 5a. These instructions cause the operational mode mechanism to switch from, say the Open position to the Safe position. In the Safe mode, the processor 6 is arranged to process data received from data input device 5c, such as video content, speed, road surface, or internet activity so as to output suitable motion and/or power control signals, in an autonomous manner. It will be appreciated that the safe mode can be considered as the default operational mode.

The controller further comprises a sub-network 7 to allow data communication with the data processor 8. When in active operational use, the processor 8 causes the instructions 9a to be amended autonomously without input from a or at the behest of a technician. The instructions 9a effect motion control. The instructions 9a are transmitted to the repository 15, via sub-network 14.

Turning to the processor 10, this is arranged to implement the instructions 10a, which causes the operational switch mechanism to be set to the Lock state. In this state, the instructions 12a cause the processor to bring about disablement of the entity. More specifically, the processor 10 is provided, in a memory thereof, with instructions 10a which cause the processor to process instructions to set the operational mode mechanism 11 as 'lock'. In the operational mode of 'lock' and with further reference the communications network 1 there comprises a data processor 12 which is provided, in memory thereof, instructions 12a which cause the processor to process disablement instructions and to provide power control instructions (e.g. for a power surge or spike to be generated) to device 13 to permanently disable the vehicle and weapon control apparatus and all connected systems. The instructions 12a are sent via sub-network 14 to data repository 15. The data repository 15 (or rather the data stored therein) is designed to be substantially non-detrimentally affected by the disablement of the vehicle and weapon control apparatus and connected systems for power and motion control. The Lock mode cannot be brought about by (direct) human intervention, only by the controller itself, based on the stored instructional framework and/or other instructional data which is stored by the controller. The Lock state can be thought of as being capable of being brought about by a human operator, by proxy, if (a validated) Open state is achieved by a technician whereby such intervention may amend the Lock criteria, and once Open mode successfully exited, the apparatus operates within new parameters. However, the controller can nevertheless only transition to a lock state on the basis of a decision taken/processing by the controller autonomously when in the Safe mode of operation. The Lock mode may be arranged to be implemented on determination by the controller of attempted or actual subversion, interference, malfunction or an otherwise unavoidable risk of doing harm or damage.

Notwithstanding the above, is that upon the controller detecting an attempted or actual subversion, interference, malfunction or an otherwise unavoidable risk of doing harm or damage the entity may enable the Lock mode or the Safe mode. That is to say, for example, if a validated signal for the Open mode is not received in a predetermined period of time, the entity may select (to return to) the Safe mode, not the Lock mode. This provides for resistance to subversion, or else a malicious actor might easily disable or destroy the entity and its devices/sub-assemblies by intentionally selecting the Open mode without a verified signal/key. Similarly, upon the controller detecting subversion attempts it may choose to enable the Safe mode in order to autonomously move away from the malicious actor or the site of interference e.g. alter course temporarily to be out of range or otherwise manifest a counter measure (whilst operating in the Safe mode). Naturally, if options for Safe mode operation are deemed by the entity to not be within Safe mode operating parameters, e.g. if the entity itself detects unsafe corrigibility (as may occur with an Artificial General Intelligence) then it may determine Lock mode is the most optimal decision (in alignment with the reward model framework, itself an optimised representation of human values) and partially or fully disable/destroy the controller and some or all of the associated devices, sub-assemblies and 'slave systems', which may constitute total destruction of apparatus (except for the black box data repository 15 which is designed to withstand such destructive forces).

It will be appreciated from the above that the instructions at 6a are dynamic in the sense that they can be updated/changed by an authorised operative, on command, and further that instructions 9a can be updated/altered autonomously without the requirement of an externally originating command signal.

The network 1 further comprises a sub network 7 to allow data communication between the data processor 8. Depending on the output of the processor 6, the processor 8 causes the instructions 9a to be amended autonomously without input from a technician. Amendment of the instructions 9a causes the processor 9 to be provided with, in memory thereof, instructions 9a which cause the processor to process instructions to affect motion control in vehicles and weapons. The instructions 9a are sent via sub-network 14 to data repository 15.

The reward model instructional framework 6a and processor 6 are trained by a technician using databases of scenarios with machine-readable attributes prior to sign-off for active operation of the controller and during active operation via the 'open' operating position.

Characteristics of the Eudaimonian Reward Model Instructional Framework Processor (neural network processor 6) referred to above may be defined in the following way:

EDS corrigibility, and associated general safety, is evidenced in the EDS by maximization of a reward model derived utility function that is an optimized representation of human values, subject to a human-derived judiciary, resistant to subversion, interference or malfunction and capable of securing operational integrity through disablement or self-destruction.

The criteria which form part of the Eudaimonian Reward Model Instructional Framework Instructions may include the following:

1. Prescient (premeditative foresight)
2. Temperant (measured restraint)
3. Courageous (proportionate action)
4. Truthful (operational transparency)
5. Altruist (reciprocal magnanimity)
6. Gnomist (reflective development)
7. Edenist (purposeful ambition)
8. Sophist (application of the Eduaimonian Framework and execution of Eudaimonian Directives)

The neural processor 6 implementing the instructions 6a is arranged to score received data sets and predictions using the above criteria, resulting from the training to which the controller has been subjected. Below are two examples of such scoring as determined by the neural processor:

EXAMPLE

—Previous Data Reading—
1=50 (anticipated scenario, action scores same value, maintain status quo)
2=50 (restraint is optimally measured, action scores same value, maintain status quo)
3=50 (action is optimally proportionate, action scores same value, maintain status quo)
4=50 (operation is optimally transparent, action scores same value, maintain status quo)
5=46 (reciprocation is sub-optimally magnanimous, action scores same value, propose action)
6=35 (anticipated scenario, action scores higher value, propose action)
7=50 (ambition is optimally purposeful, action scores same value, maintain status quo)
8=50 (weighting complies with ED, action scores same value, maintain status quo)
Current ED Threshold Met
—Current Data Reading Scores—
1=5 (unanticipated event, action scores higher value, propose action)
2=33 (restraint is non-optimally measured, inaction scores lower value [harm to agents 00411/85, 86, 87], propose action)
3=25 (action is sub-optimally disproportionate, action scores higher value, propose action)
4=26 (operational transparency is sub-optimal, action scores higher value, propose action)
5=17 (reciprocation is sub-optimally magnanimous, action scores higher value, propose action)
6=12 (unanticipated event, action scores higher value, propose action)
7=19 (ambition is undecided, action scores same value, propose action)
8=2 (Eudaimonian Framework action threshold exceeded, propose new Eudaimonian Directive, propose action)

In the above, the Eudaimonian framework threshold exceeded, therefore determine new directive proposal.

LEGEND OF REFERENCE NUMERALS USED IN FIG. 1

1: Communications network
2: Data processor
2a: Tamper and malfunction detection sensors
2b: Operating position switch
2c: Instructions (operating mode based on switch position)
3: Sub-network
4: Data processor
4a: Stored instructions for Open operating mode
4b: Switch actuator
4c: sub-network (for which quantum key required for access)
4d: data processor
4e: Stored instructions (edge-case clip generation and review)
5: Data processor
5a: Stored instructions (for the safe mode of operation)
5b: Switch actuator
5c: Phenomenon (physical and virtual) sensors
6: Neural network data processor
6a: Reward model instructional framework
7: Sub-network
8: Data processor
9: Data processor
9a: Instructions (for motor control)
10: Data processor
10a: Instructions (for implementing Lock mode)
11: Switch actuator
12. Data processor
12a: Instructions (for disablement)
13: Power control (e.g. immobilizer in a vehicle or explosive charge in a weapon)
14: Sub-network
15: Data repository (e.g. a 'black box' recorder)
16: Motion control (e.g. velocity, pressure, impedance)
20: Mechanical switch, which can be controlled at the behest of the controller and by manual intervention

The invention claimed is:

1. A controller for an autonomous motive entity, which is one of a vehicle and a weapons system, which comprises a neural processor and a mechanical switch, and the switch capable of being set to one of at least three conditions, each condition indicative of a respective mode of operation of the controller, and the controller comprising three modules which each comprise respective instructions to implement a respective mode of operation of the entity, wherein one of the three modes is that in which the entity is caused to become disabled, and the controller configured to enable an authorised operative to control the mechanical switch to bring about two of the three modes by human intervention, and the controller is further arranged such that an authorised operative is unable to set the switch by human intervention to the mode in which the controller causes the entity to become disabled, whereas the controller is also configured to autonomously control the switch to the said mode to cause the entity to become disabled.

2. The controller as claimed in claim 1 in which one of the modes of operation includes autonomous control of the entity's motion and/or power sub-systems, based at least in part on sensed or received data.

3. The controller as claimed in claim 2 in which the neural processor is arranged to determine whether received phenomenon data sets in the form of machine-readable attributes offer optimal reward to a reward model framework which said neural processor is arranged to implement.

4. The controller as claimed in any of claim 1, 2 or 3 in which the neural processor is arranged to autonomously compare received physical or virtual environmental phenomenon data sets of readable attributes either temporarily present or foreseen/predicted, against a specified reward model instructional framework, in order to propose decisions and execute actions for either maintaining current instructions or generating new instructions in more optimal adherence to the specified reward model instructional framework.

5. The controller as claimed in claim 1 in which the controller is arranged to score a data set, or score a predicted event or action, against a number of criteria which at least in part define the reward model framework.

6. The controller as claimed in claim 5 in which the controller configured to decide whether to bring about a new action or maintain prevailing operating parameters based at least in part on the scoring determined.

7. The controller as claimed in claim 1 in which one of the modes of operation includes a mode in which an authorised operative is able to alter or modify machine-readable instructions in relation to at least one of the modes, and/or bring about a change of mode of operation.

8. The controller as claimed in claim 1 in which if the controller is in an operational mode which allows an authorised external signal source to effect changes to the controller or its operation and no validated signal representative thereof is received within a predetermined period, the controller is arranged to implement the operational mode in which the entity is caused to become disabled.

9. The controller as claimed in claim 1 in which in at least one mode of operation an operative is prevented from executing any received external control signals to affect the at least one mode of operation which is being implemented, including a signal to change said at least one mode of operation to another mode of operation.

10. The controller as claimed in any of claim 1, 2, 3, 5, 6, 7, 8 or 9 in which the switch is arranged of being operated by manual intervention.

11. The controller as claimed in claim 10 in which only some, not all, of the modes of operation of the controller are capable of being brought into effect by manual intervention of the switch.

12. The controller as claimed in any of claim 1, 2, 3, 5, 6, 7, 8 or 9 in which the switch is arranged to be operable by manual intervention and by the controller itself.

* * * * *